United States Patent [19]

Irie

[11] 3,943,343

[45] Mar. 9, 1976

[54] PROGRAM CONTROL SYSTEM FOR MANIPULATOR

[75] Inventor: Akiyoshi Irie, Himeji, Japan

[73] Assignee: Kawasaki Heavy Industries, Ltd., Japan

[22] Filed: July 3, 1974

[21] Appl. No.: 485,364

[30] Foreign Application Priority Data
July 9, 1973    Japan.............................. 48-77305

[52] U.S. Cl. .......... 235/151.11; 214/1 CM; 235/152
[51] Int. Cl.² ...................... G06F 15/46; B25J 9/00
[58] Field of Search ..... 235/151.11, 152; 214/1 CM

[56]           References Cited
           UNITED STATES PATENTS
3,109,092   10/1963   Lott et al. .................. 235/151.11 X
3,589,134   6/1971    Hackmann...................... 214/1 CM
3,661,051   5/1972    Dunne et al. .......................... 91/35

Primary Examiner—Eugene G. Botz
Attorney, Agent, or Firm—Burgess, Ryan and Wayne

[57]            ABSTRACT

A program control system is disclosed wherein the coordinates of a plurality of specified points of a prescribed path in the space to be traced by a manipulator assembly which are spaced apart from each other by a line segment of the same unit length are stored in a storage device in a teaching mode, and one set of coordinates of the adjacent specified points are simultaneously and sequentially read out from the storage device in a repeat mode so that the position command signals or coordinates of a plurality of interpolation points between the adjacent specified points are obtained by linear interpolation and are sequentially compared, at a predetermined time interval, with the actual or present positions of the manipulator assembly. The manipulator assembly is displaced at a velocity corresponding to the difference between the position command signal and the actual or present position signal so that the difference may become zero.

5 Claims, 8 Drawing Figures

THE BLOCK DIAGRAM OF THE PROGRAM CONTROL SYSTEM IN ACCORDANCE WITH THE PRESENT INVENTION.

PRESCRIBED PATH USED FOR EXPLANATION OF THE PRINCIPLE OF THE PRESENT INVENTION.

FIG. 4

| SPECIFIED POINTS | X COORDINATE | Y COORDINATE |
|---|---|---|
| $P_1$ | $x_1$ | $y_1$ |
| $P_2$ | $x_2$ | $y_2$ |
| $P_3$ | $x_3$ | $y_3$ |
| $P_4$ | $x_4$ | $y_4$ |
| | | |
| $P_{n-1}$ | $x_{n-1}$ | $y_{n-1}$ |
| $P_n$ | $x_n$ | $y_n$ |

TABLE OF THE SPECIFIED POSITION INFORMATION STORED.

FIG. 5B

THE BLOCK DIAGRAM OF THE PROGRAM CONTROL SYSTEM IN ACCORDANCE WITH THE PRESENT INVENTION.

FIG. 6

PROGRAM CONTROL SYSTEM FOR MANIPULATOR

BACKGROUND OF THE INVENTION

The present invention relates to a program control system especially adapted for the operations such as automatic welding, automatic coating and so on which require continuous controls.

Various industrial robots have been recently developed and used in various fields. In the so-called "teaching mode", the manipulator assembly of an industrial robot is taught to trace a prescribed path to perform a series of operation steps in succession. Specified position information, that is the coordinates of the specified points of the prescribed path at which the specified steps of operations must be performed are stored in a storage device. In the so-called "repeat cycles", the industrial robot performs a series of operational steps taught in succession.

To control the industrial robots of the type described, the so-called point-to-point control system has been widely employed. In the repeat cycle, the command signal for causing the industrial robot to perform the first step is read out from the storage device, and is compared with the actual or present position information representative of the actual or present position of the manipulator assembly of the industrial robot, so that manipulator may be actuated or displaced in the direction in which the difference between the command signal and the actual or present position signal may become zero. When the difference becomes zero, that is when the manipulator reaches the point designated by the command signal, the manipulator is stopped, and then the next command signal is read out and compared with the actual or present position signal so that the manipulator is actuated or displaced in the direction in which the difference between the two signals may become zero. In like manner, the above operations are cycled as the manipulator is displaced from one specified point to another.

As is clear from the above explanation of the point-to-point control system, it suffices to control the manipulator assembly of an industrial robot so that the manipulator assembly may be displaced from one specified point to another of a prescribed path in space, and where the specific path the manipulator assembly follows as it moves from one specified point to the next is immaterial. The industrial robots employing the point-to-point control system are best adapted for use in the spot welding operations, assembly work and so on, in which the path along which the manipulator assembly traces from one specified point to the next is immaterial so that considerable man-power saving and the improvement in operation efficiency may be expected.

However, there arise various problems when the industrial robots employing the point-to-point control system are employed in the operations such as arc weldings, coating and so on in which the manipulator assembly of the robot must correctly trace a prescribed path in space continuously. Therefore there has been devised and demonstrated a program control system for industrial robots or manipulators in which a prescribed path to be traced by the robots or manipulators is considered as consisting of the totality of points of a prescribed path, so that the manipulator is caused to move from one specified point to the next to trace the whole prescribed path. But this system has a distinct disadvantage in that a tremendous number of sets of the coordinates of the specified points of a prescribed path must be stored in a storage device, thus resulting in intolerable complexity in the so-called "teachinng mode". Furthermore, a large volume of the position signals representing the coordinates of the specified points must of course be read out in the repeat mode, so that it becomes extremely difficult to attain high-speed control.

One of the objects of the present invention is to provide an improved program control system especially adapted for use in the operations in which the manipulator assembly of an industrial robot must correctly and continuously trace a prescribed path in the space as in the case of arc weldings, coatings and so on.

Another object of the present invention is to provide an improved program control system of the type described without causing complexity in the teaching mode and without increasing of the capacity of a storage device.

Briefly stated, according to the control system employing a program control system in accordance with the present invention, a manipulator assembly is caused to displace itself along a line segment of a unit length of a prescribed path from one specified point to the next. The position information or the coordinates of each specified point of the prescribed path is converted into digital signals by an encoder, which is provided for each axis or degree of freedom of the manipulator assembly, and the digital signals are stored in a storage device. In the repeat mode one set of the specified position information or coordinates of the adjacent specified points are read out substantially simultaneously at a predetermined time interval, and are applied to a linear interpolation unit so that the position command signals or coordinates of the interpolation points between the adjacent specified points may be sequentially obtained. The position command signals are sequentially compared, at a predetermined time interval, with the actual or present position signal representing the actual or present position of the manipulator assembly so that the manipulator may be displaced at a velocity corresponding to the difference between the position command signal and the actual or present position signal in the direction which the difference may become zero or may be eliminated. Thus the manipulator assembly may correctly trace a prescribed path.

The above and other objects, features and advantages of the present invention will become more apparent from the following description of one preferred embodiment thereof taken in conjunction with the accompanying drawing.

DESCRIPTION OF THE PREFERRED EMBODIMENT

Figure 1:
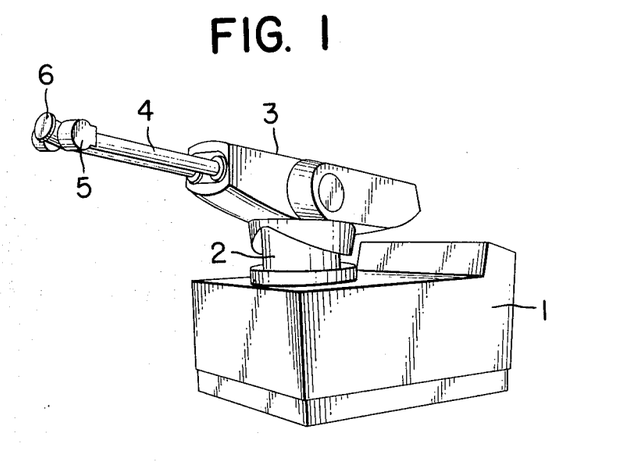
FIG. 1 is a perspective view of one example of an industrial robot employing a program control system in accordance with the present invention.

An industrial robot shown in FIG. 1 has a casing 1 housing therein a part of a hydraulic system and electrical and electronic devices including a power source, motors, control circuits and so on in order to provide a desired four articulations or degrees of freedom for a manipulator assembly 3. The hydraulically-powered manipulator assembly 3 is supported by a hollow trunk or pole 2 which in turn is rotatably mounted upon the casing 1 and is rotated by a hydraulic cylinder housed in the casing 1, so that the hydraulically powered manipulator assembly 3 may rotate in unison with the hollow trunk 2. Around the trunk 2 is disposed an elevating hydraulic cylinder (not shown) so that the manipulator assembly 3 may be vertically displaced along the trunk 2. A pair of hollow extension rods 4 are attached to the manipulator assembly 3 in such a way that they may be extended out of, or retracted into the manipulator assembly 3 by a hydraulic cylinder housed therein. The ends of the pair of extension rods 4 terminate in a hand-gear-train assembly 5 to which is coupled a hand assembly through a rotary joint 6.

Figure 2A:
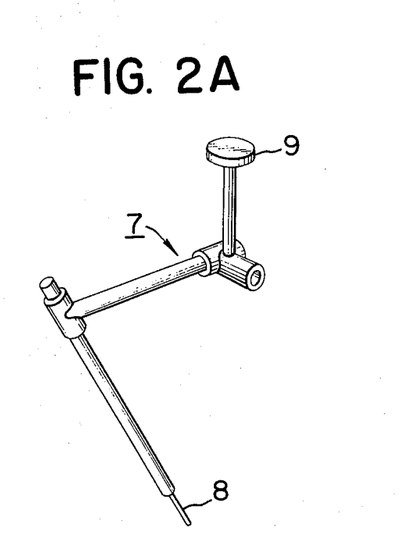
FIGS. 2A and 2B show two examples of a hand assembly adapted for use with the industrial robot of the type shown in FIG. 1.
Figure 2B:
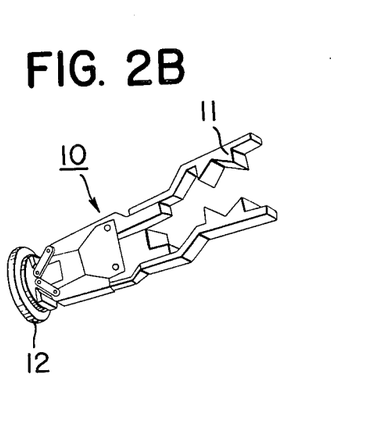

Examples of the hand assembly adapted to be coupled to the hand-gear-train assembly 5 of the industrial robot are shown in FIGS. 2A and 2B. The hand assembly of the type shown in FIG. 2A and coupled to the hand-gear-train assembly 5 through its joint 9 is adapted to perform arc welding with a welding torch 8 while the hand assembly 10, of the type shown in FIG. 2B and coupled to the hand-gear-train assembly 5 through its joint 12, has a pair of gripping fingers 11 adapted to handle an object of a specified configuration.

Since the industrial robot of the type described above with reference to FIGS. 1, 2A, and 2B is described in detail for instance in U.S. Pat. No. 3,661,051, granted to M. J. Dunne et al., further description shall not be made in this specification.

The program control system in accordance with the present invention permits the hand-gear-train assembly and hence the hand-arm assembly of the industrial robot of the type shown in FIG. 1 to be continuously positioned at the specified points of a prescribed curve in the space. When, for instance, the hand assembly 7 of the type shown in FIG. 2A is utilized, arc welding along a prescribed path or welding line may be easily accomplished.

Figure 3:
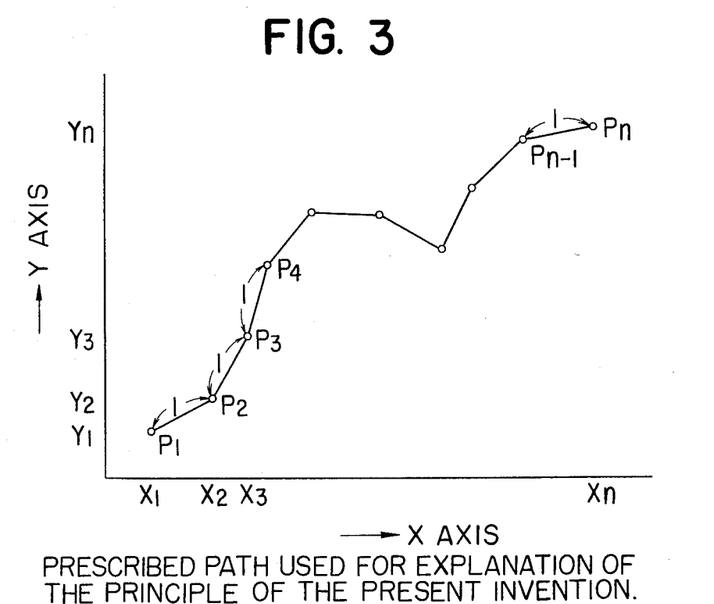
FIG. 3 shows a prescribed path used for the explanation of the underlying principle of the present invention.
Figure 4:
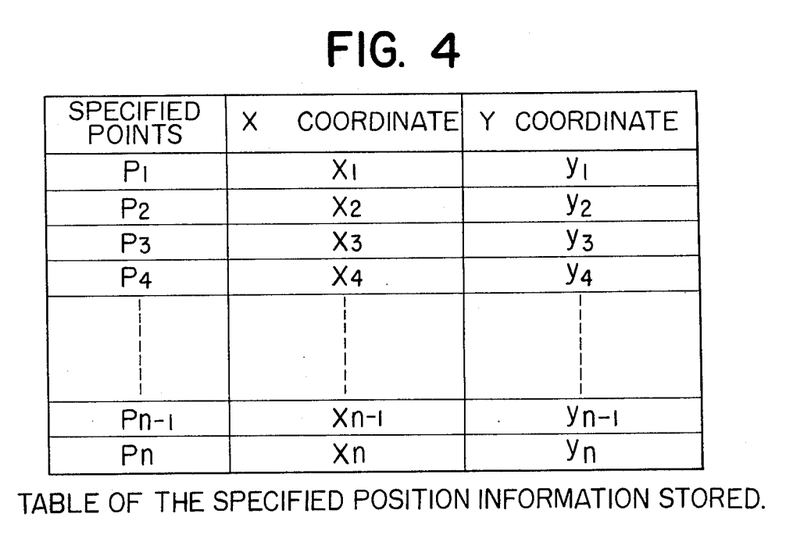
FIG. 4 shows an example of a set of specified position information or coordinates of specified points of a prescribed path stored in a storage device.

Next referring to FIGS. 3 and 4, the underlying principle of the present invention will be described hereinafter. For the sake of simplicity, it is assumed that the hand assembly traces a prescribed path or curved line passing through the specified points $P_1, P_2 \ldots$ and $P_n$ whose coordinates in the two-dimensional rectangular cartesian coordinate system with X and Y axes are generally given by $(x_i, y_i)$, where $i = 1, 2 \ldots$ and $n$. Furthermore, it is assumed that any adjacent specified points $P_{i-1}$ and $P_i$ satisfy the following equation $$(x_i - x_{i-1})^2 + (y_i - y_{i-1})^2 = \text{const.} \quad (1)$$

In other words, the distance or increment between the adjacent specified points $P_{i-1}$ and $P_i$ or the length $l$ of a line segment is constant. In this specification, the length $l$ will be referred to either as "the unit length of a line segment" or "the unit length $l$".

The specified position or coordinate information of every specified point $P_i$ of the curved line to be traced and spaced apart from each other by the unit length $l$ is stored in a storage device of the industrial robot, and, in case of the "repeat mode", is read out at a predetermined time interval so that the manipulator assembly may control the hand assembly so as to trace a prescribed curved line. FIG. 4 shows the table of the specified position or coordinate information stored. It is readily understandable to those skilled in the art that it is not preferable to reduce the unit length $l$ infinitely because the number of the specified points $P_i$ is tremendously increased, the "teaching" mode becomes very complex, and a memory device with a large capacity is required. Therefore, in the instant embodiment the unit length $l$ is selected as 1 mm, and the coordinates of some interpolation points between the adjacent specified points $P_{i-1}$ and $P_i$ are obtained by a linear interpolation as will be described in more detail hereinafter.

In general, the distances or increments between the adjacent points $P_{i-1}$ and $P_i$ along the X and Y axes are given by $$\begin{cases} V_x = x_i - x_{i-1} \\ V_y = y_i - y_{i-1} \end{cases} \quad (2)$$

For the sake of simplicity, it is assumed that the unit length $l$ is divided into ten sections, and that the interpolation points are $P_{(i-1,1)}, P_{(i-1,2)} \ldots$ and $P_{(i-1,9)}$. Then, their coordinates obtained by a linear interpolation are given by the following table.

Table 1

| interpolation points | X coordinate | Y coordinate |
|---|---|---|
| $P_{i-1,1}$ | $\frac{V_x}{10} \times 1 + x_{i-1}$ | $\frac{V_y}{10} \times 1 + y_{i-1}$ |
| $P_{i-1,2}$ | $\frac{V_x}{10} \times 2 + x_{i-1}$ | $\frac{V_y}{10} \times 2 + y_{i-1}$ |
| — | — | — |
| $P_{i-1,9}$ | $\frac{V_x}{10} \times 9 + x_{i-1}$ | $\frac{V_y}{10} \times 9 + y_{i-1}$ |

According to the present invention, in case of the "repeat mode", the coordinates of the adjacent specified points $P_{i-1}$ and $P_i$ are substantially simultaneously read out from the memory device, next the distance or increments $V_x$ and $V_y$ along the X and Y axes are calculated, and then the coordinates of the interpolating points $P_{(i-1,1)}, P_{i-1,2} \ldots$ and $P_{(i-1,9)}$ are obtained by a linear interpolation. The coordinates of the interpolation points that is, the position command signals are sequentially and from time to time compared with the actual or present position of the hand assembly, so that the deviation of the actual position from the interpolation point may be made zero. Since the coordinates of the interpolation points are read out at a predetermined time interval, the operating unit seems to be tracing a prescribed curved line passing through all of the specified points substantially at a constant resultant velocity. In other words, in general, the velocity of the manipulator assembly is dependent upon the difference between the position command signal and the actual or present position signal so that, according to the present invention, the command velocity is given at each interpolation point so as to trace the prescribed path passing through the specified points.

However, it is apparent to those skilled in the art that, unlike the conventional point-to-point control system, in the control system of the present invention the deviation continually occurs so that it does not follow that the operating unit traces the prescribed path defined by the coordinates of the interpolation points. In order to overcome this problem, according to the present invention, the discrepancy or difference between the position command information, i.e. the coordinates of the interpolation points (a sort of velocity command) and the information of the present or actual position is applied to the servo valves in the manipulator assembly through an integrator so that when the deviation increases, the velocity of the manipulating assembly is increased so as to make the deviation zero. This means that the position is controlled based upon the position command signals plotted over each unit length $l$.

Figure 5A:
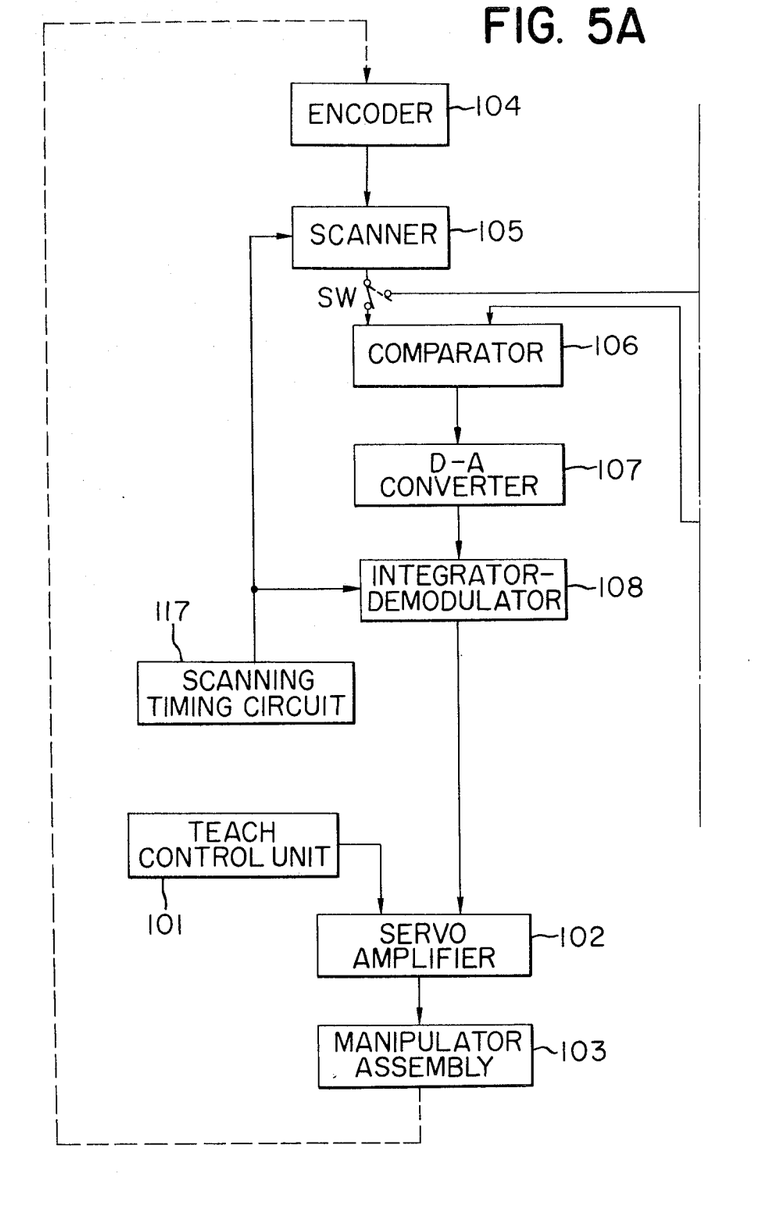
FIG. 5A and 5B is a block diagram of one preferred embodiment of a program control system in accordance with the present invention.
Figure 5B:
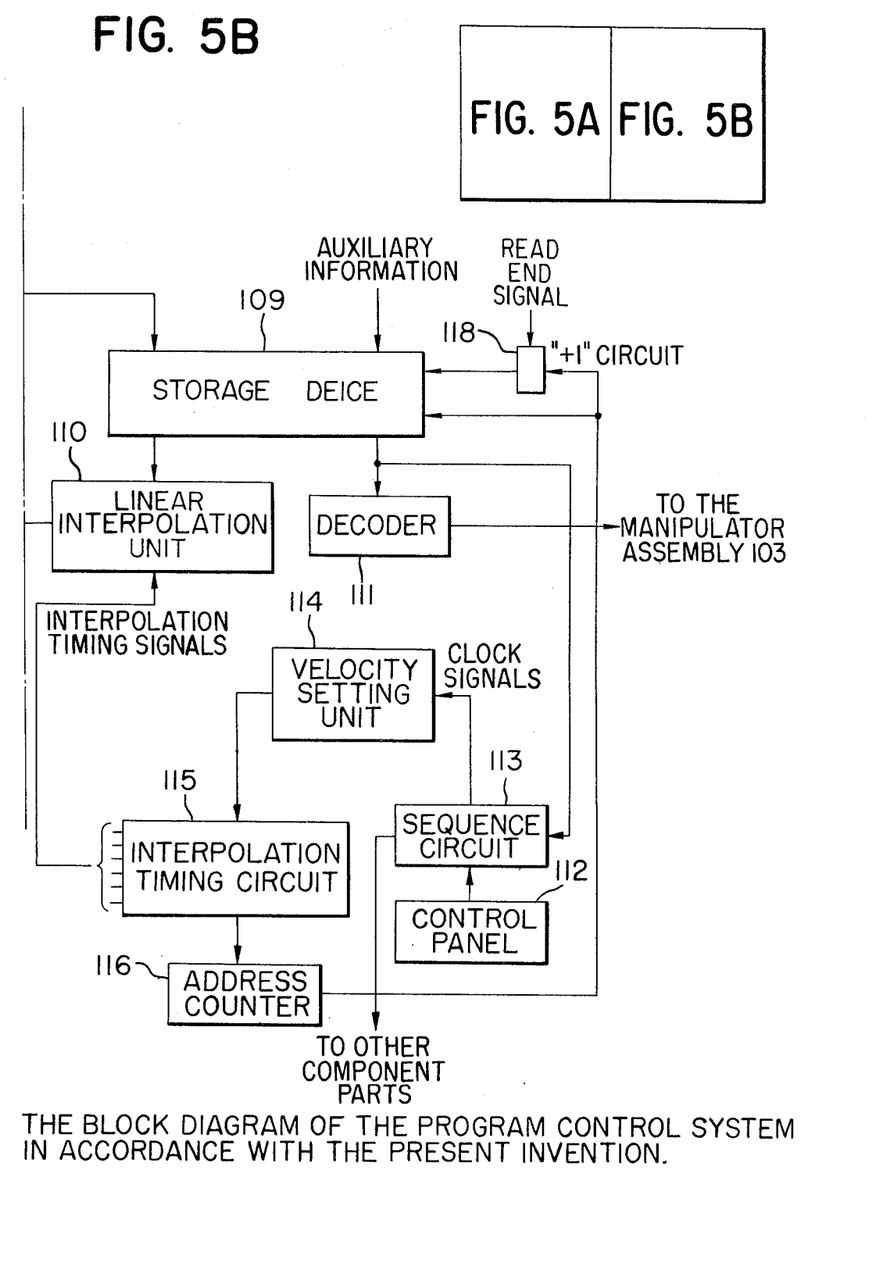

FIG. 5 is a block diagram of the program control system in accordance with the present invention. A storage device 109 stores the coordinates of all of the specified points $P_i$ and other auxiliary information which is required for causing the hand assembly to perform a required operation. Since the industrial robot of the type shown in FIG. 1 has four degrees of freedom or four axes, the specified position information for each of four axes must be stored in the storage device 109. Like the conventional industrial robots, the robot of the type shown in FIG. 1 is controlled by a program control system having the two fundamental modes, that is the "teach mode" and "the repeat mode".

In the teach mode, a switch SW is thrown as indicated by the broken lines in FIG. 5 so that a teach control unit 101 drives a servo amplifier 102 to cause a manipulator unit 103 to advance over the unit length $l$ along a prescribed path each time. In practice, four servo amplifiers 102 must be provided for four axes or degrees of freedom. The specified point information for each axis is converted by a encoder 104 into digital signals which are transferred through a scanner 105 and the switch SW into the storage device 109. The scanner 105 has a function of scanning the encoder output of each axis. The above operations are cycled each time the manipulator assembly 103 is advanced over the unit length $l$ from one specified point to the next of a prescribed path so that the specified position information or the coordinates of the specified points $P_i$ may be sequentially stored in the storage device 109. In the teach mode, the addresses in the storage device 109 are accessible in response to the output of an address counter 116 which is incremented by one each time the manipulating unit 103 is advanced over the unit length $l$ along a prescribed path. As described hereinbefore, other auxiliary information which is required for causing the hand assembly of the industrial robot to perform a desired operation at a certain specified point is also stored in the storage device 109, together with the specified position information. For instance, the auxiliary information is such that when the manipulator assembly 103 reaches a predetermined point it causes the hand assembly to grip or release an object. In the repeat mode the specified position information stored in the storage device is used to obtain the position command signals or coordinates of the interpolation points between the adjacent specified points $P_i$ to be applied to the manipulator unit 103.

The teaching or repeat mode may be arbitarily selected by a control panel 112 connected to a sequence circuit 113 which has a function of giving not only the timing signals, but also the control signals to other component parts in the control system in response to the command signals from the control panel 112. For instance, a scanning timing circuit 117, which controls not only the timing of the scanning cycle of the scanner 105 and but also an integrator-demodulator 108 to be described hereinafter in more detail, is driven in response to the timing signals derived from the sequence circuit 113. The sequence circuit 113 is connected to a velocity setting circuit 114, which in turn is connected to a linear interpolation timing setting circuit 115, which in turn is connected to an address counter 116. The velocity setting circuit 114 is adapted to step down the clock signals derived from the sequence circuit 113 so that the speed for reading the specified position information from the storage device 109, that is, the velocity at which the manipulating unit 103 traces a prescribed path, may be changed. The velocity setting circuit 114 is controlled in response to the signal from the control panel 112. The output pulses of the velocity setting circuit 114, that is the clock pulse signals stepped down to a predetermined repetition rate, cause the linear interpolation timing setting circuit 115 to step up and to cause the address counter 116 to step up in response to an overflow pulse from the timing circuit 115. The timing with which a linear interpolation unit 110 operates is determined by the interpolation timing signal derived from the timing circuit 115. A decoder 111 decodes the various auxiliary information read out of the storage device 109, and its output is applied to the manipulating assembly 103.

In "the repeat mode", the address counter 116 steps up at a predetermined time interval in response to the clock signals which have been stepped down to a predetermined repetition rate as the timing pulses derived from the sequence circuit 113 pass through the velocity setting circuit 114, and the interpolation timing setting circuit 115. In response to the output signal from the address counter 116, the coordinates of the first specified point $P_1$ are read out, and then the coordinates of the next specified $P_2$ point are read out. In this case, when the coordinates of, for instance, the first specified point $P_1$ are read out, the signal representative of the completion of read out is generated, so that the output signal or address signal (that is, the content in the address counter 116) which is to be applied to the storage device 109 is stepped up so that the coordinates of the next specified point $P_2$ may be read out from the storage device 109. The operation for stepping up the address counter 116 is accomplished by a +1 circuit 118. The coordinates of the first and next specified points $P_1$ and $P_2$ read out from the storage device 109 are applied to the linear interpolation arithmetic unit 110 which computes first the distances or increments $V_x$ and $V_y$ between the first and next specified points $P_1$ and $P_2$ (see FIG. 3) and then divides them ($V_x$ and $V_y$) by the number (in the instant embodiment, 10) of desired interpolation points. Thereafter in response to the interpolation timing signal from the interpolation timing setting circuit 115, the quotients, that is $(x_2 - x_1)/10$ and $(y_2 - y_1)/10$, are added to the coordinates $x_1$ and $x_2$ so that the position command signal or coordinates $$\left(x_1 + \frac{y_1 - x_1}{10}\right), \left(y_1 + \frac{y_2 - y_1}{10}\right)$$

of the first interpolation point may be obtained. In like manner, the coordinates of the second interpolation point and so on may be obtained. In practice, the X and Y coordinates for each of the four axes are of course obtained not simultaneously but sequentially in synchronism with the scanning timing of the scanner 105. Meanwhile the actual position of the manipulator assembly 103 is detected and converted by the encoder 104 into the digital signals which are scanned by the scanner 105. In the repeat mode the switch SW is switched to the position indicated by the solid lines in FIG. 5.

The position command signal, that is the coordinates of each interpolation point are compared by a comparator 106 with the actual or present position signal derived from the scanner 105 so that the deviation between them may be detected. It is sufficient to provide only one comparator 106 and only one digital-to-analog converter 107, regardless of the degree of freedom of the manipulator assembly in FIG. 1. The output signal of the comparator 106, representing the deviation between the position command signal and the actual or present position signal representative of the actual position of the manipulator assembly, is applied to the digital-to-analog converter 107 to be converted into the analog signal which is converted to the signal representative of a velocity by an integrator-demodulator 108, the number of which is equal to the number of axes (in the instant embodiment, four). The integrator-demodulator 108 has also a function of integrating the deviation described hereinbefore. The output signal from the integrator-demodulator 108 is amplified by the servo amplifier 102 so that the manipulator assembly 103 may be controlled.

The component parts 102 through 108 described hereinbefore with reference to FIG. 5 are substantially similar in construction and operation to those of the conventional industrial robots, and are disclosed in detail in said U.S. Pat. No. 3,661,051. The storage device 109 may be a magnetic drum or disk or magnetic core memory. The velocity setting circuit 114 may be a variable frequency divider, and the circuits 115 and 116 may be a binary or $n$-step counter.

Figure 6:
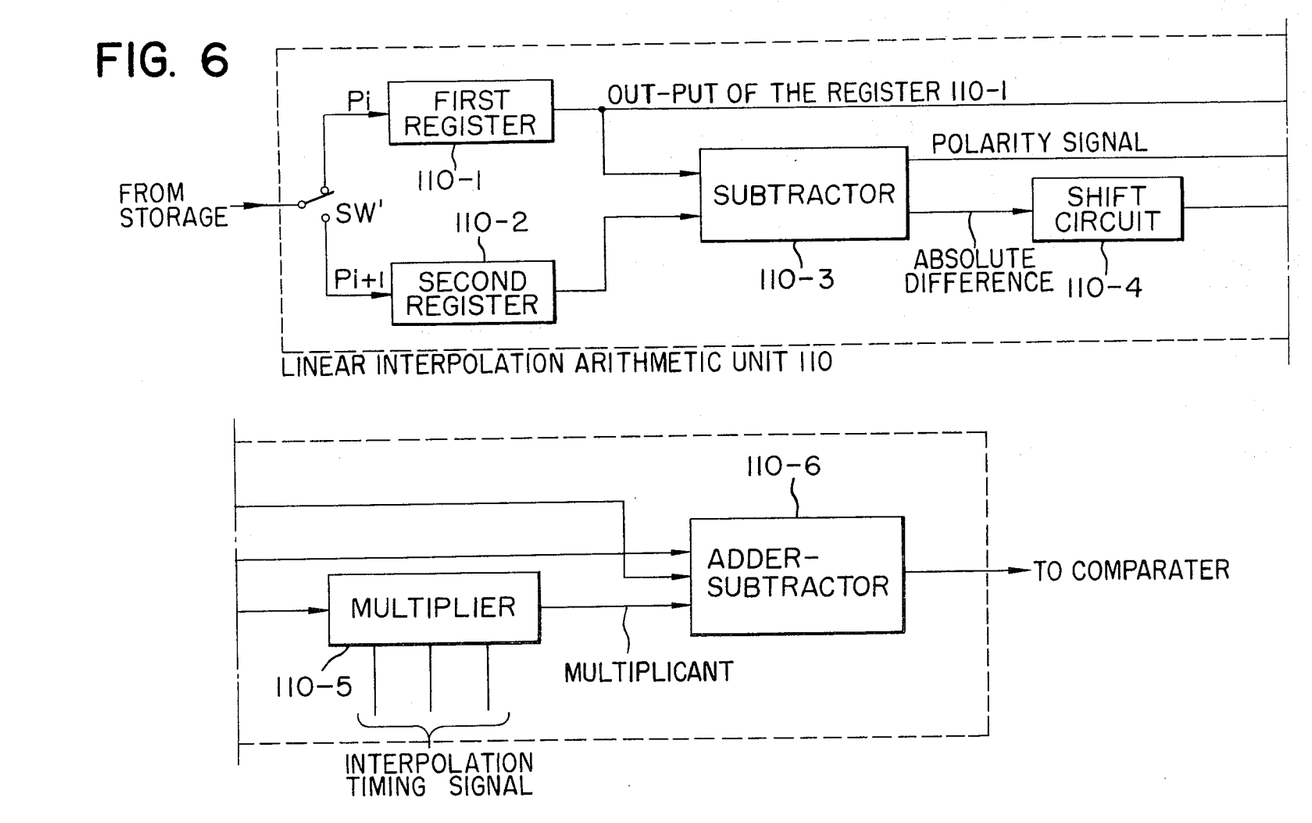
FIG. 6 is a detailed block diagram of a linear interpolation unit shown in FIG. 5.

The linear interpolation circuit may be of the type shown in FIG. 6. The position command information or coordinates of the specified points $P_i$ read out of the storage device are transferred into a first register 110-1, while that of the next specified point $P_{i+1}$, into a second register 110-2 as a switch SW' is so thrown as to interconnect the storage device and the second register 110-2. The absolute difference or increment between the two reference points $P_i$ and $P_{i+1}$ is obtained by a subtractor 110-3, and is applied to a shift circuit 110-4, while a polarity signal is applied from the subtractor 110-3 to an adder-subtractor 110-6. In the shift circuit 110-4, the signal representative of the difference or increment between the two reference points $P_i$ and $P_{i+1}$ is stepped down by N bits that is, to $(P_i - P_{i+1})/2^N$, and transferred into a multiplier 110-5. Therefore passing the output of the subtractor 110-3 is equivalent to dividing it by $2^N$, i.e. an N power of the base 2. In the multiplier 110-5, the multiplier, that is the N-bit interpolation timing signal from the interpolation timing setting circuit multiplies a multiplicand, that is the output of the shift circuit 110-4, and the product, that is the output of the multiplier 110-5 is applied to the adder-subtractor 110-6 together with the output of the first register 110-1 and the polarity signal from the first subtractor 110-3. The adder-subtractor 110-6 adds or subtracts the output of the multiplier 110-5 to or from the output of the first register 110-1, depending upon whether the polarity signal from the first subtractor 110-3 indicates a positive or negative increment. The output of the adder-subtractor 110-6 is the position command signal representing the coordinates of each interpolation point between the specified points $P_i$ and $P_{i+1}$, the line segment of the unit length $l$ connecting these two specified points being divided by $2^N$. As described with reference to FIG. 5, the output of the adder-subtractor 110-6 is applied to the comparator 106. As with the case of the comparator 106 and the digital-to-analog converter 107 shown in FIG. 5, it suffices to provide only one linear interpolation circuit 110 in common for all axes.

What is claimed is:

1. A program control system for controlling the motions of a manipulator assembly for tracing a prescribed path in space comprising
   a. encoder means for generating position information representative of the coordinates of a plurality of specified points of said prescribed path in space which are spaced apart from each other solely by line segments of the same unit length,
   b. storage means connected to said encoder means for storing therein in addressable locations said specified position information representative of the coordinates of said plurality of specified points of said prescribed path which are spaced apart from each other by line segments of the same unit length,
   c. means for receiving a pulsatory clock signal, address counter means responsive to said clock signal for periodically generating addresses of said storage means at regularly spaced intervals, said clock signal receiving means and address counter means comprising reader means for reading from said storage means at a predetermined time interval the specified position information representative of the coordinates of the adjacent specified points as one set of the specified position information,
   d. interpolation arithmetic means for sequentially providing the coordinates of N interpolation points as position command signals between said adjacent specified points by linear interpolation based upon said set of specified position information,
   e. detecting means for sequentially comparing said position command signals with the signals representative of the actual or present position of said manipulator assembly and for generating a signal representing the difference between said two signals, and
   f. means for moving said manipulator assembly at a velocity corresponding to said signal representing the difference between said two signals so that the difference between said two signals may become zero.

2. A program control system as defined in claim 1 further comprising means for integrating the signals each representing the difference between the position command signal at each interpolation point and the signal representative of the actual or present position of said manipulator assembly so that said manipulator assembly may be displaced at a velocity corresponding to the resulting integrated value.

3. A program control system as defined in claim 1, wherein the manipulator assembly has four degrees of freedom, further comprising
   scanning means for sequentially transferring the digital signals corresponding to the coordinates of each point into the storage means, and
   switch means connected to said scanner for providing said sequential digital signals to said detector means whereby the coordinates of the manipulator assembly are sequentially available for comparison with said coordinates from said interpolation arithmetic means.

4. A program control system as defined in claim 1, wherein said manipulator assembly further comprises a hand assembly for gripping objects, address counter means for providing a unique output signal corresponding to each position command signal, said storage means further comprising means for storing a hand motion signal at a storage location corresponding to at least one of the output signals from said address counter means and decoder means connected to said storage means and responsive to the reading from said storage means of the specified position information at a storage location corresponding to said at least one of said output signals of said address counter means and for providing hand motion signals to said hand assembly.

5. A program control system as defined in claim 1, wherein said interpolation arithmetic means comprises a first register, a second register, means for transferring the position information corresponding to two adjacent positions into said first and second register, means for subtracting the contents of said first and second register, shift circuit means for dividing the output of said subtraction means by N where N is equal to a positive integer, multiplier means for sequentially multiplying the output of said shift circuit means by integers between 1 and 10 and combining means for combining the output of said subtraction means with the output of said multiplier means thereby sequentially providing the coordinates of N interpolation points.

* * * * *